United States Patent [19]  
Sano et al.

[11] 4,268,662  
[45] May 19, 1981

[54] PROCESS FOR IMPROVING SEMIPERMEABLE MEMBRANES BY TREATING WITH PROTIC ACIDS OR INORGANIC SALTS

[75] Inventors: Takezo Sano, Takatsuki; Takatoshi Shimomura, Toyonaka; Ichiki Murase, Ibaraki, all of Japan

[73] Assignee: Sumitomo Chemical Company, Limited, Osaka, Japan

[21] Appl. No.: 17,326

[22] Filed: Mar. 5, 1979

[30] Foreign Application Priority Data

Mar. 17, 1978 [JP] Japan .................................. 53-31571  
Mar. 31, 1978 [JP] Japan .................................. 53-38608

[51] Int. Cl.³ .............................................. C08F 6/00  
[52] U.S. Cl. ............................. 528/486; 204/159.14; 204/165; 210/22 D; 210/23 H; 210/23 F; 210/500 M; 528/485; 528/487; 528/488; 264/22  
[58] Field of Search ............... 525/344, 340, 353, 355, 525/377, 386; 528/492, 485, 486, 487; 204/159.14, 159.16, 165

[56] References Cited

U.S. PATENT DOCUMENTS

| | | | |
|---|---|---|---|
| 3,150,917 | 9/1964 | Gagliardi | 525/344 |
| 3,402,136 | 9/1968 | Sakuragi | 260/23.7 R |
| 3,551,394 | 12/1970 | Sakuragi | 525/340 |
| 3,565,876 | 2/1971 | Ball | 528/487 |
| 3,615,024 | 10/1971 | Michaels | 210/190 |
| 3,948,870 | 4/1976 | Stay | 526/303 X |
| 4,067,825 | 1/1978 | Hradil | 525/329 |
| 4,147,745 | 4/1979 | Sano et al. | 264/22 |

Primary Examiner—C. A. Henderson  
Attorney, Agent, or Firm—Stevens, Davis, Miller & Mosher

[57] ABSTRACT

A process for improving the performances of semipermeable membranes which comprise an acrylonitrile polymer containing 40 to 100% by mole of acrylonitrile and have a bubble point of more than 0.1 kg/cm², by dipping said membranes in an aqueous solution containing inorganic salts and/or protic acids.

12 Claims, No Drawings

PROCESS FOR IMPROVING SEMIPERMEABLE MEMBRANES BY TREATING WITH PROTIC ACIDS OR INORGANIC SALTS

The present invention relates to a process for improving the performances of semipermeable membranes comprising an acrylonitrile polymer used for reverse osmosis, ultrafiltration or the like. More particularly, it relates to a process for improving the performance of semipermeable membranes by increasing water permeability (referred to as "flux" hereinafter) without damaging the solute rejection of the membranes.

BACKGROUND OF THE INVENTION

Recently, a reverse osmosis process or ultrafiltration process using semipermeable membranes made of cellulose acetate, polyamide or the like has become widely used in various fields such as production of fresh water from sea water, waste water treatment, control of electro-deposition bath, food industry and medical industry. What is important in these separation processes with membranes is the selective permeability of the membranes, i.e. solute rejection and flux. Particularly, it is not too much to say that the quantity of flux is a factor determining the economical value of the processes.

Up to date, a large number of studies have been made to increase the flux of semipermeable membranes used for reverse osmosis and ultrafiltration, and even the studies reported in patents and papers are too numerous to enumerate. Many of the studies are closely related to a membrane casting process, so that it may be said that the studies to increase the flux of semipermeable membranes are equivalent to a study of said process.

Of these studies, typical ones may be a study to produce asymmetric membranes having active surface skin layers of the smallest possible thickness, a study to produce an ultrathin membrane corresponding to the active surface skin layer followed by backing the membrane on a porous support into a composite, and the like. These studies may be a regular approach to the improvement of flux, but it is not always said that they provide a general and more practical method.

On the other hand, it is well known that there are acrylonitrile copolymers as a raw material for the production of semipermeable membranes. In spite of many trials to produce semipermeable membranes of acrylonitrile polymer, the membranes produced are low in solute rejection although they have a large flux. And, it is said that their solute rejection is particularly low when the solute is sodium chloride which is a low molecular electrolyte. This is the reason why semipermeable membranes of acrylonitrile polymer can not be used for reverse osmosis although they find a practical application in ultrafiltration.

Previously, in view of the good film forming property, thermal resistance, acid resistance and alkali resistance of acrylonitrile polymers, the inventors extensively studied a process for producing semipermeable membranes capable of rejecting even low molecular electrolytes such as sodium chloride at a high rate. As a result, the inventors succeeded in producing semipermeable membranes of acrylonitrile polymer having better thermal, mechanical and chemical properties and higher solute rejection than the conventional cellulose acetate membranes when used for reverse osmosis, by the epoch-making process of plasma-treatment of porous membranes of acrylonitrile polymer (Japanese Patent Publication No. 38988/1977). This process brought about a great advance that can be never attained by the prior arts to the field of semipermeable membranes of acrylonitrile polymer.

SUMMARY OF THE INVENTION

The inventors continued a further study to improve the performances of semipermeable membranes of different acrylonitrile polymers including plasma-treated ones. As a result, the inventors found that these semipermeable membranes can remarkably be improved in the flux without strikingly damaging their solute rejection by dipping them in an aqueous solution containing an inorganic salt and/or a protic acid. The inventors thus attained the present invention.

An object of the present invention is to provide a process for improving the performances of semipermeable membranes of acrylonitrile polymer, particularly preferably plasma-treated semipermeable membranes of acrylonitrile polymer, by dipping the membranes in an aqueous solution containing an inorganic salt and/or protic acid.

DETAILED DESCRIPTION OF THE INVENTION

The embodiment of the present invention will be illustrated in detail hereinafter.

The acrylonitrile polymer constituting the semipermeable membranes used in the present invention includes polyacrylonitrile and various types of copolymers containing acrylonitrile monomer as a component, both of which can be produced by the well-known methods. As comonomers constituting the copolymers together with acrylonitrile, there may be mentioned various well-known nonionic and ionic monomers copolymerizable with acrylonitrile. For example, the nonionic monomers include acrylamide, diacetone acrylamide, N-vinyl-2-pyrrolidone, hydroxyethyl methacrylate, methyl acrylate, ethyl acrylate, butyl acrylate, methyl methacrylate, ethyl methacrylate, vinyl acetate, vinyl chloride, styrene and the like. The ionic monomers include acrylic acid, methacrylic acid, ethylenesulfonic acid, methallylsulfonic acid, sulfopropyl methacrylate, vinylbenzenesulfonic acid; metallic salts thereof; tertiary amines such as 2-vinylpyridine, 4-vinylpyridine and dimethylaminoethyl methacrylate; and salts of the quaternary amines resulting from alkylation of the tertiary amines. The acrylonitrile copolymers used herein are copolymers of acrylonitrile and one or more of the monomers.

The acrylonitrile polymers used in the present invention refer to polyacrylonitrile and copolymers containing at least 40% by mole of acrylonitrile and 60% by mole or less of at least one of these comonomers. When the acrylonitrile content is less than 40% by mole, a sufficient effect to increase the flux can not be obtained by dipping the semipermeable membrane in an aqueous solution containing an inorganic salt and/or protic acid, so that no practical value is observed.

Consequently, preferred acrylonitrile polymers usable in the present invention are those containing 40% by mole or more, particularly preferably 70 to 95% by mole, of acrylonitrile.

The molecular weight of the polymers is preferably 5,000 to 5,000,000 in terms of the mechanical strength of membrane.

The semipermeable membranes usable in the present invention refer to those which have selectivity in the permeation of substances of which the size is of the order of a molecule. They include a wide range of semipermeable membranes of acrylonitrile polymer ranging from reverse osmosis membranes capable of rejecting low molecular compounds having a molecular weight of less than 500, to ultrafiltration membranes usable for separation in a molecular weight region of 500 to $10^6$, and finally to microfilters which can reject super-high molecular compounds having a molecular weight exceeding $10^6$ (e.g. proteins) but permit other substances to pass therethrough. They need to have a bubble point of more than 0.1 kg/cm$^2$. Bubble point: In a system comprising water and air which are separated from each other by a membrane, the pressure at which the air begins to enter the water through the membrane when pressure on the air is slowly increased.

In order to make the process of the present invention more effective, it is desirable that the semipermeable membranes have a bubble point of more than 1 kg/cm$^2$.

How to produce the semipermeable membranes of acrylonitrile polymer used in the present invention is not particularly limited. But, particularly preferred membranes are those obtained by the conventional wet casting process comprising casting of solution, evaporation of a part of solvent and gelation, and those obtained by further plasma-treatment thereof.

The plasma referred to herein means one generated by glow discharge, corona discharge or the like. For example, the plasma by glow discharge is generated by introducing a gas not polymerizable by plasma (e.g. hydrogen, helium, argon, nitrogen, oxygen, carbon monoxide, carbon dioxide, ammonia, water) into a vacuum vessel containing a pair of electrodes so that the pressure in the vessel becomes 0.01 to 10 Torr, and applying an alternating current or direct current at a voltage of 0.5 to 50 KV between the electrodes.

The plasma-treated membranes can be obtained by exposing semipermeable membranes to the plasma described above.

These semipermeable membranes may be used in various forms. Specifically, they may have the form of a flat membrane, tube, hollow fiber or yarn, or may be a composite with other porous supports.

The aqueous solution containing inorganic salt and/or protic acid used for dipping the semipermeable membrane is suitable for increasing the flux without causing deterioration of the membrane and great damage of the solute rejection. Specific examples of the aqueous solution of inorganic salts include sea water and those of water-soluble inorganic salts selected from the group consisting of halides, sulfates, carbonates, nitrates, phosphates, borates, acetates, oxalates, rhodanates and other inorganic salts of metals or ammonium and double salts, complex salts and chelate compounds containing the metals. The metals include those in Group IA (e.g. lithium, sodium, potassium), Group IB (e.g. copper, silver), Group IIA (e.g. beryllium, magnesium, calcium, barium), Group IIB (e.g. zinc, cadmium), Group IIIA (e.g. aluminium, gallium), Group IIIB (e.g. scandium, yttrium), Group IVA (e.g. tin, lead), Group IVB (e.g. titanium, zirconium), Group VA (e.g. antimony, bismuch), Group VB (e.g. vanadium, niobium), Group VI (e.g. selenium, molybdenum), Group VII (e.g. manganese) and Group VIII (e.g. iron, cobalt, nickel). Of these compounds, water-soluble inorganic salts selected from the group consisting of the halides, sulfates, nitrates, acetates, rhodanates and oxalates of lithium, sodium, potassium, copper, calcium or barium are particularly preferred.

These inorganic salts may be used alone or in combination, and those containing a multivalent metallic cation having a large hydration number are preferred. In the case of semipermeable membranes of acrylonitrile polymer containing the aforesaid ionic monomer, it is apparent that there exists interaction between the metallic cations and high molecular segments. Also, in case where the acrylonitrile polymer comprises the nonionic monomer alone as the comonomer, it is needless to say that the usual electrostatic action and the nitrile group of acrylonitrile play an important role in this interaction.

The protic acids referred to herein include inorganic acids (e.g. sulfuric acid, hydrochloric acid, phosphoric acid, nitric acid) and organic acids (e.g. carboxylic acids, sulfonic acids). These protic acids may be used alone or in combination. Of these acids, inorganic acids such as sulfuric acid, hydrochloric acid, phosphoric acid and nitric acid are particularly preferred because of their remarkable effect. These protic acids may be used as a mixture with the aforesaid inorganic salt.

The conditions in which the semipermeable membrane is dipped in the aqueous solution containing the inorganic salt and/or the protic acid are as follows: The concentration of either inorganic salt or protic acid in the aqueous solution may optionally be determined, so far as the form of membrane can be kept. When the aqueous solution contains the inorganic salts, the concentration of the salts is within a range of 0.001% by weight to saturation particularly preferably 1 to 10% by weight. When the aqueous solution contains the protic acid, the concentration of the acid ranges from 0.5-normal to high concentrations at which the membrane is not dissolved. When the concentration is less than 0.5-normal, the effect is not remarkable. For example, particularly preferred concentrations are as follows: 1-N to 16-N for sulfuric acid; 1-N to 6-N for hydrochloric acid; 1-N to 15-N for phosphoric acid; and 1-N to 7-N for nitric acid. In the combined use of the inorganic salts and protic acids, the foregoing concentration ranges also apply to each case.

The temperature of the aqueous solution is within the range of the freezing point to boiling point of the solution, particularly preferably 0° C. to the temperature of the softening point of the acrylonitrile polymer.

The dipping time is 1 minute or more, and, how long the time may be is less than that whereby an adverse effect is caused. From the practical point of view, however, a range of 1 hour to 100 hours is generally preferred.

As described above, the characteristic of the present invention is to increase the flux of semipermeable membranes of acrylonitrile polymer with the solute rejection of the membranes being undamaged by dipping the membranes in the aqueous solution containing the inorganic salt and/or protic acid. The effect of the process of the present invention is particularly remarkable in the following cases: The semipermeable membranes are made of acrylonitrile and a nonionic monomer; they are in a dry state; and they are plasma-treated membranes, and particularly where they are intended for use in the region of reverse osmosis.

The semipermeable membranes obtained by the process of the present invention are greatly increased in flux with the solute rejection being undamaged. Consequently, they can be used with large economical effects in different fields of industry.

That is, the semipermeable membranes obtained by the process of the present invention are widely used for separation or concentration of substances by reverse osmosis, ultrafiltration or the like. More specifically, they are used for production of fresh water from sea water, waste water treatment, concentration of fruit juices, separation of non-aqueous fluids and other processes.

The present invention will be illustrated more specifically with reference to the following examples, which are not however to be interpreted as limiting the invention thereto.

The solute rejection is defined by the following equation:

$$\text{Solute rejection (\%)} = \left(1 - \frac{\text{the concentration of solute in permeated solution}}{\text{the concentration of solute in feed solution}}\right) \times 100$$

EXAMPLE 1

A copolymer comprising 89% by mole of acrylonitrile and 11% by mole of methyl acrylate was synthesized by the well-known method. Twenty parts by weight of the copolymer was dissolved in a mixed solvent of 70 parts by weight of dimethylformamide and 10 parts by weight of formamide. The resulting solution was then cast on a glass plate kept at 40° C. so that the thickness of the solution was 250μ. After 1 minute's evaporation, the glass plate was immersed in a water bath of 16° to 17° C. to carry out gelation of the solution. After 2 hours, the resulting membrane was separated from the glass plate and dried at room temperature for 24 hours. The membrane was treated in a plasma-treatment glass apparatus, in which a pair of electrodes were set, to obtain a plasma-treated membrane. The plasma-treatment conditions were as follows:

| Gas | : Helium |
| --- | --- |
| Degree of vacuum | : 0.2 Torr |
| Discharge voltage | : 3.0 KV |
| Discharge current | : 25 mA |
| Treating time | : 40 minutes |

This plasma-treated membrane had a bubble point of 29.0 kg/cm². Parts of this membrane were cut off and dipped in 1% sodium chloride solution, sea water, 1% aqueous copper sulfate solution and 1% aqueous barium acetate solution, respectively, at room temperature for 24 hours. The original plasma-treated membrane and the dipped membranes were mounted on a circulation type reverse osmosis apparatus (effective area of membrane: 13.0 cm²) usually used in a laboratory and tested for saline water permeability (sodium chloride concentration: 0.50%) as follows: The saline water (25° C.) was supplied to the cell at a feed rate of 630 ml/min under a pressure of 50 kg/cm²; and the flux and salt rejection were measured 24 hours after the beginning of the test. The results are shown in Table 1.

TABLE 1

| Treatment with inorganic salts | Flux [LMH$^{(1)}$] | Salt rejection (%) |
| --- | --- | --- |
| None (original membrane) | 14.2 | 97.0 |
| 1% Aqueous sodium chloride solution | 17.4 | 96.9 |
| Sea water | 21.5 | 97.2 |
| 1% Aqueous copper sulfate solution | 25.4 | 97.2 |
| 1% Aqueous barium acetate solution | 33.4 | 96.9 |

$^{(1)}$LMH: liter/m²/hour

As is apparent from the table, the plasma-treated membrane could remarkably be increased in flux with its salt rejection undamaged by dipping it in the aqueous solution containing the inorganic salt.

EXAMPLE 2

A copolymer comprising 90% by mole of acrylonitrile and 10% by mole of vinyl acetate was synthesized by the well-known method. Twenty-one parts of the copolymer was dissolved in a mixed solvent of 69 parts of dimethylformamide and 10 parts of formamide. The resulting solution was then cast on a glass plate kept at 40° C. so that the thickness of the solution was 250μ. After 1 minute's evaporation, the glass plate was immersed in a water bath of 16° to 17° C. to carry out gelation of the solution. After 2 hours, the resulting membrane was separated from the glass plate and dried at room temperature for 24 hours. The membrane was treated in the same plasma-treatment apparatus as in Example 1 to obtain a plasma-treated membrane. The plasma-treatment conditions were as follows:

| Gas | : Hydrogen |
| --- | --- |
| Degree of vacuum | : 0.1 Torr |
| Discharge voltage | : 3.0 KV |
| Discharge current | : 30 mA |
| Treating time | : 40 minutes |

This plasma-treated membrane had a bubble point of 33.2 kg/cm². Parts of this membrane were cut off and dipped in 1% aqueous barium acetate solution for 1 day, 7 days, 33 days and 80 days, respectively, at room temperature to examine the effect of the dipping time. And, the effect of the concentration was examined by dipping the test samples in 1%, 5% and 10% aqueous barium acetate solutions, respectively, at room temperature for one day.

The original plasma-treated membrane and the dipped membranes were mounted on the same circulation type reverse osmosis apparatus as in Example 1 and measured for flux and salt rejection under the same conditions as in Example 1. The results are shown in Table 2.

TABLE 2

| Treatment conditions | | Flux (LMH) | Salt rejection (%) |
| --- | --- | --- | --- |
| Concentration (%) | Dipping time (day) | | |
| None (original membrane) | | 12.3 | 98.2 |
| | 1$^{(1)}$ | 25.6 | 98.0 |
| 1 | 7 | 22.5 | 98.0 |
| 1 | 33 | 26.9 | 98.1 |
| 1 | 80 | 27.4 | 97.9 |
| 1 | 1$^{(2)}$ | 25.6 | 98.0 |
| 5 | 1 | 24.5 | 98.3 |
| 10 | 1 | 23.7 | 97.9 |

$^{(1)(2)}$Same data

It is apparent from the table that a large effect to increase the flux appears by dipping the membrane in 1% aqueous barium acetate solution at room temperature for only one day.

EXAMPLE 3

A membrane having a bubble point of 35.0 kg/cm² was obtained by casting, gelation and 24 hours' drying at room temperature according to Example 1. Parts of this membrane were cut off and dipped in 1% aqueous copper sulfate solution and 1% aqueous nickel acetate solution, respectively, at room temperature for 24 hours. The original membrane and the dipped membranes were measured for flux and salt rejection in the same manner as in Example 1. The results are shown in Table 3. It is apparent from the table that this dipping treatment increases not only flux but also salt rejection.

TABLE 3

| Treatment with inorgaic salts | Flux (LMH) | Salt rejection (%) |
|---|---|---|
| None (original membrane) | 6.2 | 2.0 |
| 1% Copper sulfate | 72.3 | 25.0 |
| 1% Nickel acetate | 55.6 | 33.2 |

EXAMPLE 4

A plasma-treated membrane having a bubble point of 38.0 kg/cm² was obtained in the same manner as in Example 1. Parts of this membrane were cut off and dipped in distilled water and various protic acids (acetic acid, sulfuric acid, hydrochloric acid, phosphoric acid, nitric acid), respectively, at room temperature. The original membrane and the dipped membranes were mounted on the same circulation type reverse osmosis apparatus as in Example 1 and measured for flux and salt rejection under the same conditions as in Example 1. The results are shown in Table 4.

TABLE 4

| | Treatment with protic acid | | | |
|---|---|---|---|---|
| | Protic acid | Concentration | Dipping time (day) | Flux (LMH) | Salt rejection (%) |
| 1 | None | (Original membrane) | | 4.6 | 97.1 |
| 2 | None | Distilled water | 2 | 6.8 | 97.6 |
| 3 | None | Distilled water | 9 | 7.2 | 97.1 |
| 4 | Acetic acid | 1% | 1 | 10.5 | 97.2 |
| 5 | Sulfuric acid | 1 N | 1 | 14.5 | 97.8 |
| 6 | Hydrochloric acid | 1 N | 2 | 22.1 | 96.8 |
| 7 | Phosphoric acid | 1 N | 2 | 12.5 | 97.2 |
| 8 | Phosphoric acid | 10 N | 2 | 18.6 | 97.7 |
| 9 | Phosphoric acid | 10 N | 8 | 18.9 | 97.2 |
| 10 | Nitric acid | 5 N | 1 | 20.4 | 96.9 |

It is apparent from the table that the plasma-treated membrane can remarkably be increased in flux with its salt rejection undamaged by dipping it in the aqueous protic acid solution.

EXAMPLE 5

A membrane having a bubble point of 35 kg/cm² was obtained by casting, gelation and 24 hours' drying at room temperature according to Example 1. Parts of this membrane were cut off and dipped in 12-N and 16-N aqueous sulfuric acid solutions and 1-N aqueous hydrochloric acid solution, respectively, at 45° C. for 24 hours. The original membrane and the dipped membranes were measured for flux and salt rejection in the same manner as in Example 1. The results are shown in Table 5. By this dipping treatment, the flux was remarkably increased and at the same time the salt rejection was also increased.

TABLE 5

| Treatment with protic acid | Flux (LMH) | Salt rejection (%) |
|---|---|---|
| None (original membrane) | 4.0 | 3.0 |
| 12-N Sulfuric acid | 23.8 | 22.9 |
| 16-N Sulfuric acid | 78.6 | 24.5 |
| 1-N Hydrochloric acid | 20.1 | 21.8 |

EXAMPLE 6

A plasma-treated membrane having a bubble point of 33.2 kg/cm² was obtained according to Example 2. Parts of this membrane were cut off and dipped in aqueous sulfuric acid solutions under the following conditions to examine the effects on the performances of membrane.

The original plasma-treated membrane and the dipped membranes were then mounted on the same circulation type reverse osmosis apparatus as in Example 1 and measured for flux and salt rejection under the same conditions as in Example 1. The results are shown in Table 6.

TABLE 6

| Treatment with aqueous sulfuric acid | | | | |
|---|---|---|---|---|
| Concentration | Dipping time (day) | Temperature (°C.) | Flux (LMH) | Salt rejection (%) |
| — | (Original membrane) | — | 7.9 | 97.6 |
| 1 N | 1 | 25 | 15.7 | 97.8 |
| 1 N | 7 | 25 | 18.5 | 97.4 |
| 1 N | 33 | 25 | 20.8 | 97.6 |
| 1 N | 80 | 25 | 25.4 | 96.8 |
| 1 N | 1 | 45 | 18.3 | 98.0 |
| 5 N | 1 | 45 | 20.8 | 97.3 |
| 12 N | 1 | 45 | 25.7 | 97.2 |
| 12 N | 1 | 60 | 27.0 | 96.8 |
| 12 N | 1 | 70 | 33.6 | 93.2 |
| 18 N | 1 | 45 | 83.7 | 65.0 |

It is apparent from the table that the effect to increase the flux appears remarkably by dipping the membrane in the aqueous sulfuric acid solutions at room temperature for only one day, and that the salt rejection is not damaged markedly under these treating conditions.

What is claimed is:

1. A process for treating semipermeable membrane comprising an acrylonitrile polymer containing 40 to 100% by mole of acrylonitrile and having a bubble point of more than 0.1 kg/cm², which comprises dipping said semipermeable membrane for a period of one minute or more in an aqueous solution containing an acid selected from the group consisting of inorganic acids, sulfonic acids and carboxylic acids having a concentration of 0.5 N or higher but below that which would dissolve the membrane.

2. A process according to claim 1, wherein said semipermeable membrane has a bubble point of more than 1 kg/cm².

3. A process according to claim 1, wherein said semipermeable membrane is a plasma-treated one.

4. A process according to claim 3, wherein said plasma-treated one is obtained by exposing a semipermeable membrane to a plasma generated by glow discharge at a voltage of 0.5 to 50 KV and under a pressure of 0.01 to 10 Torr.

5. A process according to claim 1, wherein said acrylonitrile polymer includes polyacrylonitrile and copolymers of acrylonitrile and one or more of monomers selected from the group consisting of acrylamide, diacetone acrylamide, N-vinyl-2-pyrrolidone, hydroxyethyl methacrylate, methyl acrylate, ethyl acrylate, butyl acrylate, methyl methacrylate, ethyl methacrylate, vinyl acetate, vinyl chloride, styrene, acrylic acid, methacrylic acid, ethylenesulfonic acid, methallylsulfonic acid, sulfopropyl methacrylate, vinylbenzenesulfonic acid, metallic salts of the acids, tertiary amines comprising 2-vinylpyridine, 4-vinylpyridine and dimethylaminoethyl methacrylate and salts of the quaternary amines resulting from alkylation of the tertiary amines.

6. A process according to claim 1 or 5, wherein said acrylonitrile polymer contains 70 to 95% by mole of acrylonitrile.

7. A process according to claim 1, wherein said aqueous solution is one containing an acid selected from the group consisting of sulfuric acid, hydrochloric acid, phosphoric acid and nitric acid.

8. A process according to claim 7, wherein said aqueous solution is 1-N to 16-N sulfuric acid, 1-N to 6-N hydrochloric acid, 1-N to 15-N phosphoric acid or 1-N to 7-N nitric acid.

9. A process according to claim 1, wherein said semipermeable membrane is dipped for 1 to 100 hours.

10. A process according to claim 1, wherein the dipping temperature is the freezing point to boiling point of the aqueous solution.

11. A process according to claim 10, wherein the dipping temperature is 0° C. to the temperature of softening point of the acrylonitrile polymer.

12. A process according to claim 1, said semipermeable membrane has the form of flat membrane, tube, hollow fiber or yarn, or is a composite with other porous supports.

* * * * *